Dec. 15, 1970  J. R. McCONNELL  3,546,772
STRUCTURAL MEMBER FABRICATING PROCESS
Filed June 17, 1968  7 Sheets-Sheet 1

INVENTOR.
John R. McConnell

Dec. 15, 1970     J. R. McCONNELL     3,546,772
STRUCTURAL MEMBER FABRICATING PROCESS
Filed June 17, 1968     7 Sheets-Sheet 3
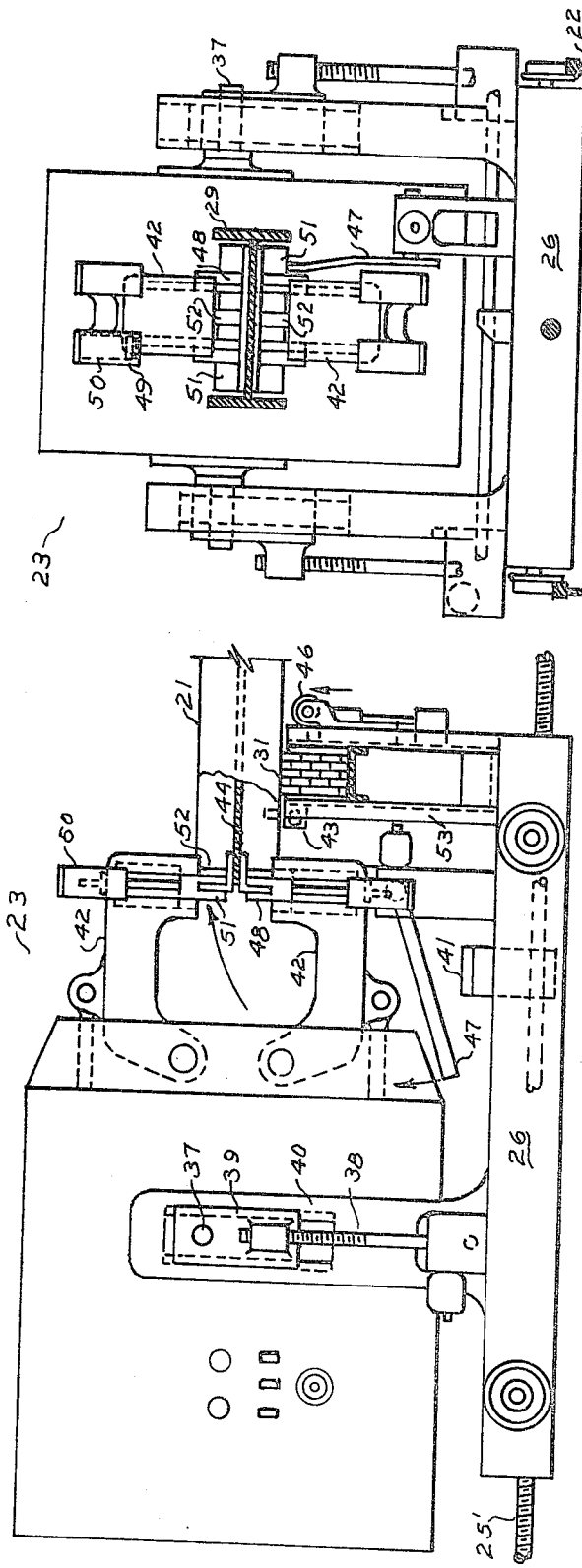
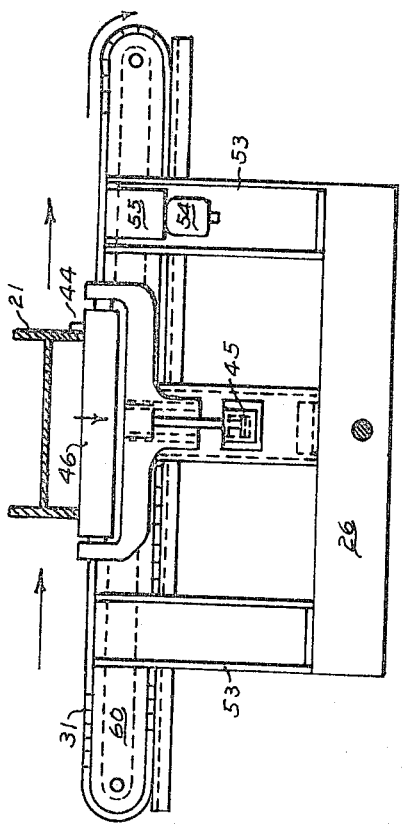
INVENTOR.
John R. McConnell

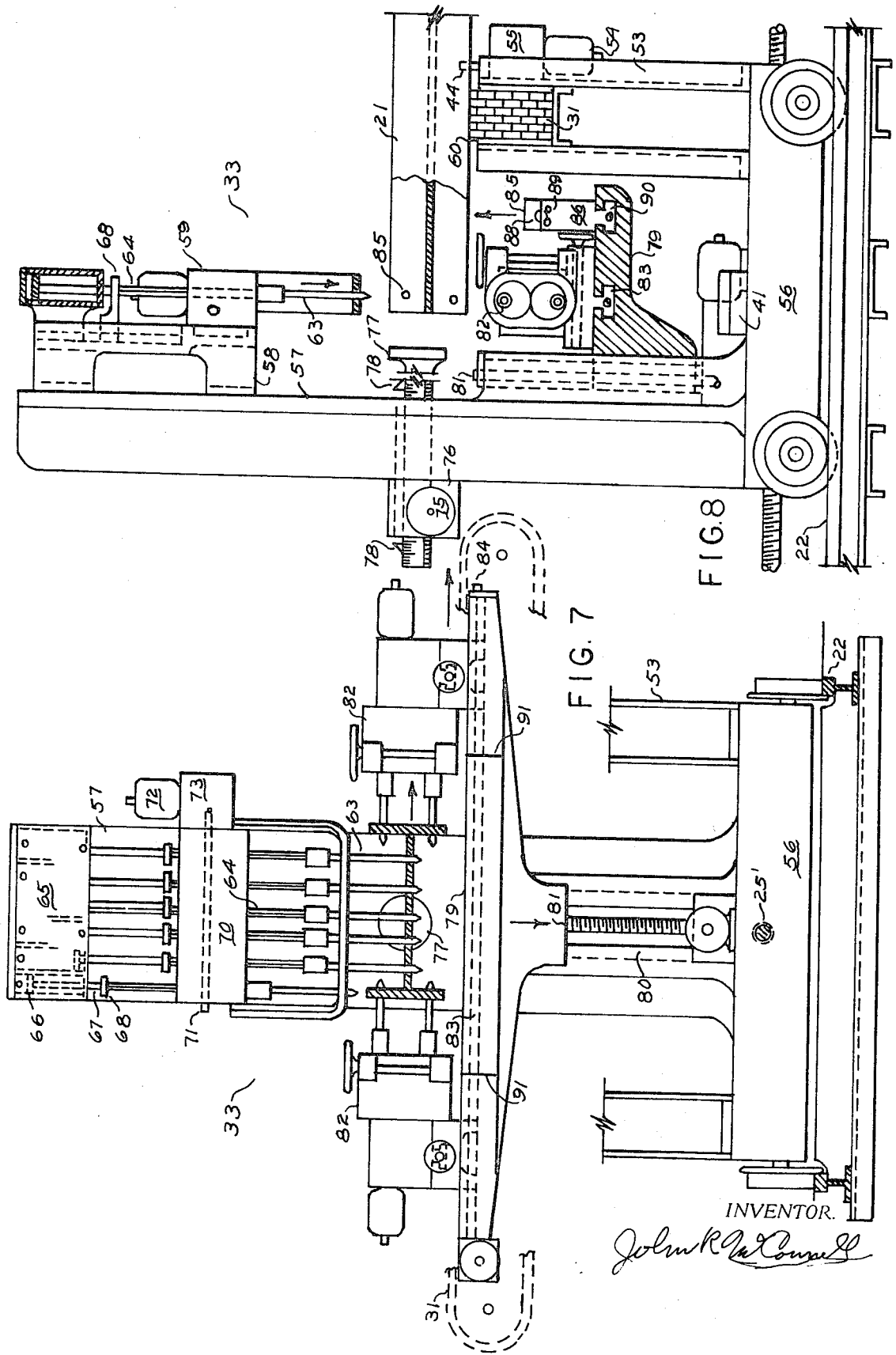

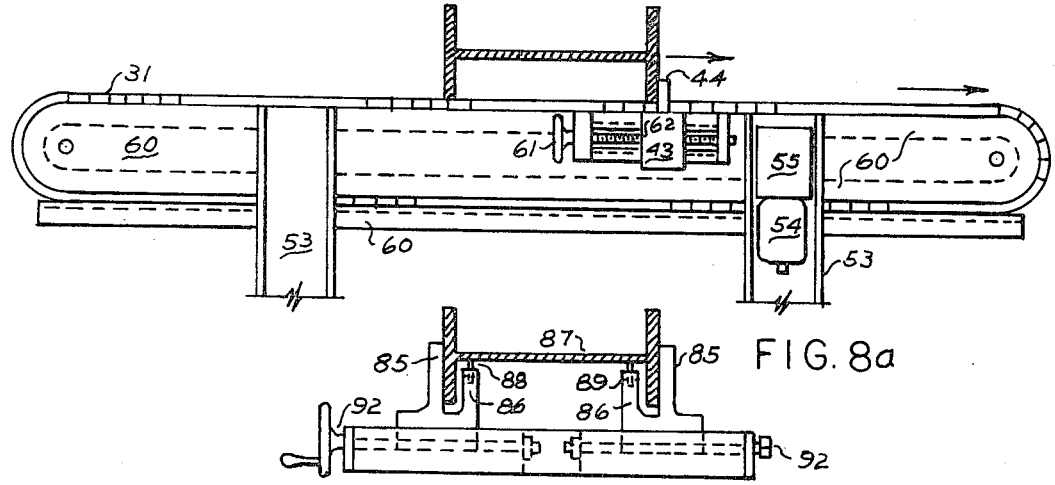
FIG. 8a
FIG. 8b
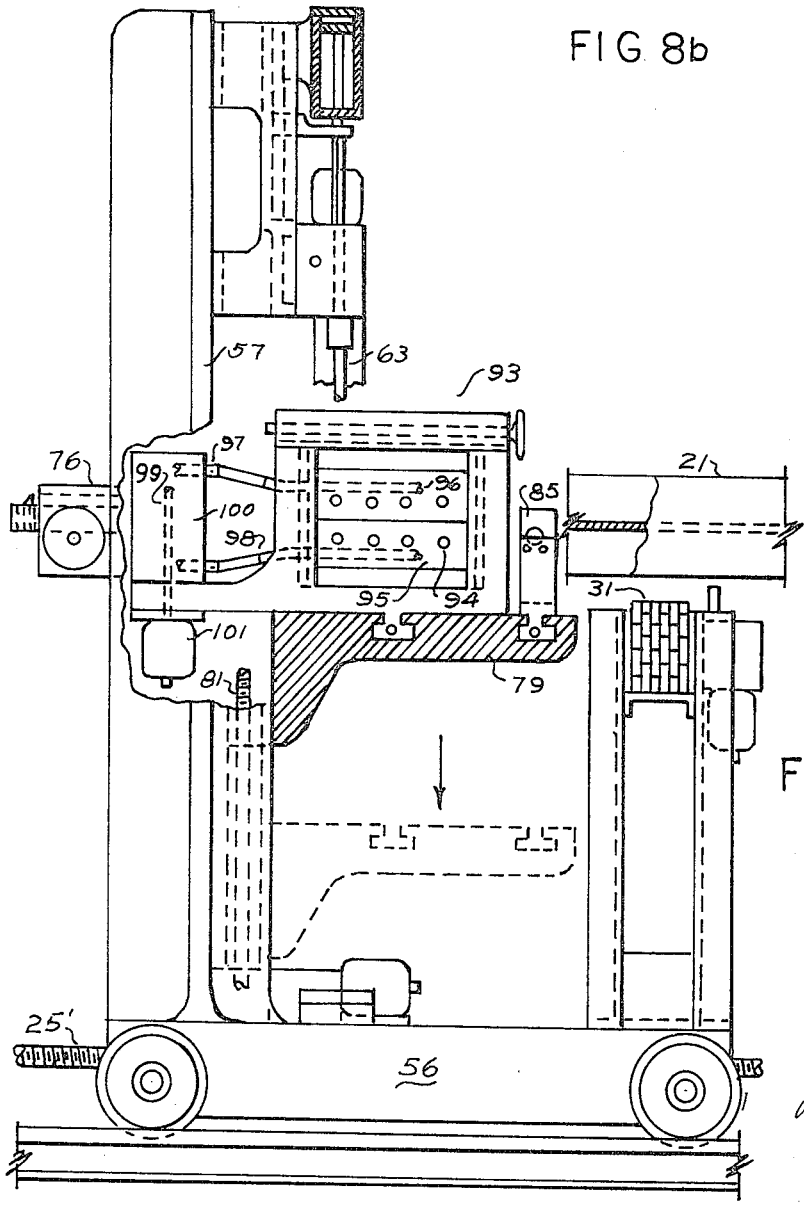
FIG. 9

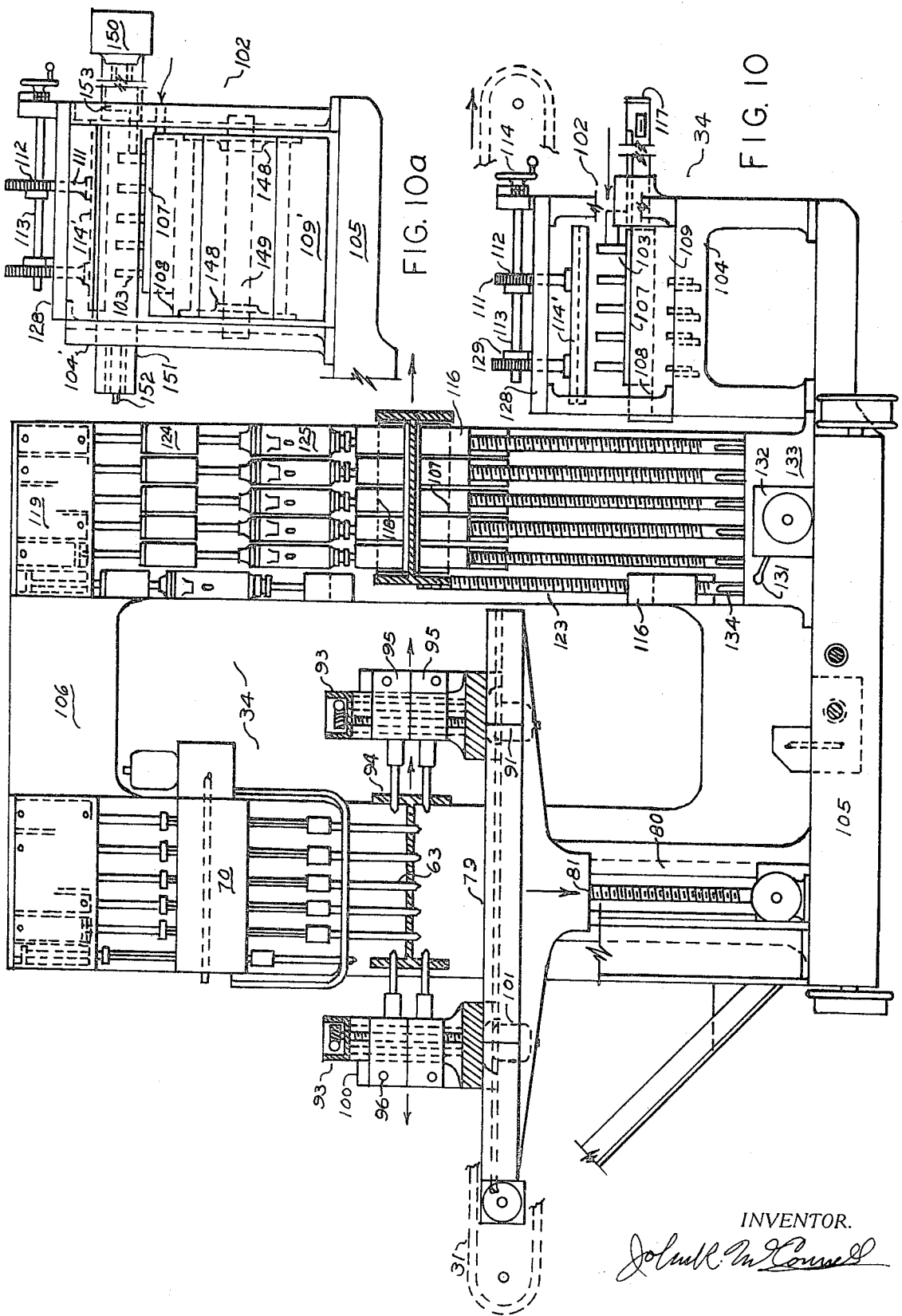

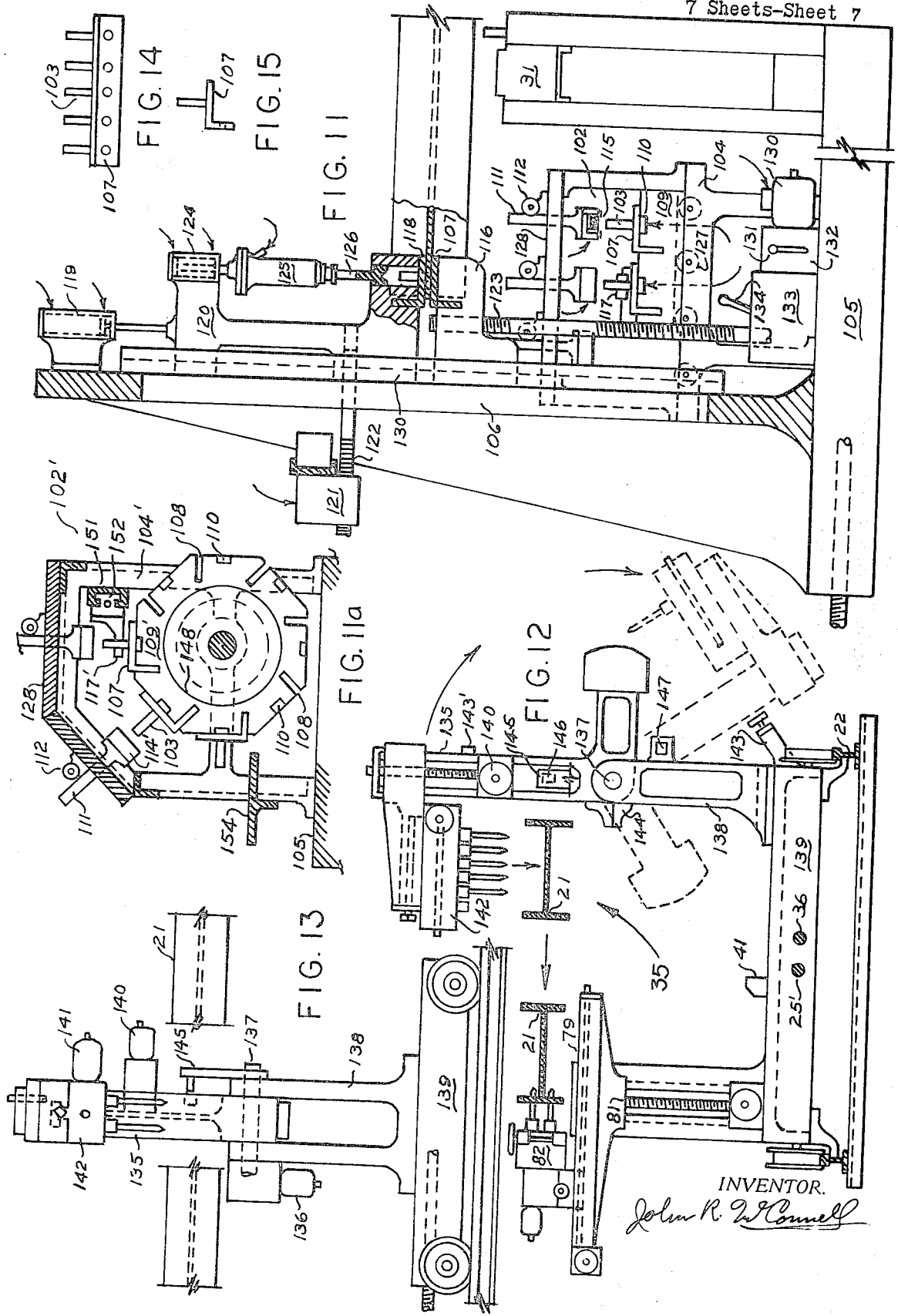

United States Patent Office 3,546,772
Patented Dec. 15, 1970

3,546,772
STRUCTURAL MEMBER FABRICATING PROCESS
John R. McConnell, 148 Woodside Ave.,
Ridgewood, N.J. 07450
Filed June 17, 1968, Ser. No. 737,654
Int. Cl. B23p *17/00, 19/00, 19/04*
U.S. Cl. 29—430                     1 Claim

ABSTRACT OF THE DISCLOSURE

A method is disclosed of handling and completely fabricating structural steel floor members from raw steel shapes into precisely fitting interlocking unit elements that form, with the necessary columns, a multiple-cell cage for the support of floors, roofs, walls and other elements. In a typical application of the process, a trailer-load or car-load of raw shapes from the steel rolling mills is shunted alongside a longitudinally-disposed multiple fabricating apparatus, that includes a travelling hoist operable along a transverse overhead gantry runway spanning the apparatus and the necessary parallel delivering and shipping vehicles. Successive raw shapes are hoisted out of the delivering vehicle and lowered to the adjacent dual conveyor belts, that transversely move them individually into the operating area of the dual end-located three way drills, that simultaneously drill the webs and flanges of the shape near the ends, for attachment of pairs of end connection angles to the web of the shape. The flange holes permit the attachment to wind-bracing brackets located on the supporting columns. The intermediately located, vertically pivotable drills drill the web for floor beam connections. Moved onto the forward half of the apparatus, multiple rivets attached to a lower connection angle are heated, the angle is assembled to the beam web, an upper mating connection angle is placed over the projecting rivets and plural air hammers head the rivets over the three assembled pieces of steel. This operation is performed at each end of the shape. The now completed member is lifted off the dual belts and stacked in an empty parallel vehicle for outbound shipping. FIG. 4 best sets forth a typical example of this overall process that is applicable to other combinations of different fabricating operations.

An objective of the process is to eliminate the repetitive hoisting-handling-transferring and stacking of the raw shapes from the incoming cars into the storage yard, the similar operations for the recovery and distribution of the said material from the yard to various plural progressive work areas, and the movement to the shipping area, where the completed members are finally loaded into outgoing cars or trailers for delivery; thereby avoiding between-operations-storage delays and reducing costs.

One objective is to provide an integrated coacting apparatus and system that will take raw shapes from an inbound delivering vehicle, process them into completely finished building members and deposit them in an outbound vehicle for direct shipment to the building site.

Another objective is to provide an apparatus that will quickly process unit members of various lengths, depths and weights, producing completed members of precise overall working lengths from raw shapes of shorter random lengths. The said unit members will be unitary end products for site assembly-erection.

For other objects and a better understanding of the invention reference may be had to the following detailed description taken in conjunction with the accompanying drawings showing typical applications in which;

FIG. 5 is a side view of the resistance welder.

FIG. 6 is an end view of the resistance welder.

FIG. 6a is an end view of the conveyor belt and shape elevating roller.

FIG. 7 is a view of the operating end of the end drilling unit.

FIG. 8 is a side view of the end drilling unit, partly in section, of FIG. 7.

FIG. 8a is an elevation of the conveyor belt and shape stopping mechanism of FIG. 7.

FIG. 8b is an elevation of the shape vise and roller discs of FIG. 8.

FIG. 9 is a side view of the end drilling unit, partly in section, of FIG. 10 with alternate paired flange-drilling units.

FIG. 10 is an end view of a combined drilling, rivet heating, and rivet driving unit.

FIG. 10a is an end view of an alternate rotary rivet heating and placement unit for FIG. 10.

FIG. 11 is a sectional view of the rivet heating-driving unit taken on FIG. 10.

FIG. 11a is a sectional view taken on FIG. 10a alternate.

FIG. 12 is an end view of the intermediate combined web and flange drilling unit.

FIG. 13 is a side view of the vertically-pivotable drilling unit taken on FIG. 12.

FIG. 14 is a side view of a connection angle with rivet shanks welded thereto.

FIG. 15 is an end view taken on FIG. 14.

A brief résumé of the process is: a carload of raw shapes of ordered lengths comes in from the rolling mills onto the fabricating shop's siding. If it is for a top-time-priority job it is switched to a position alongside the proper fabricating apparatus as soon as the equipment is available. The carload of identical beams or girders (or mixed sizes) is completely fabricated in a matter of hours and out of the shop in a delivering car or trailer.

The dual end-located fabricators are symmetrically prelocated from the centre anchorage by a common right and left threaded shaft to locate their operating centres the precise distance apart required by the member. Intermediate units would be moved separately as required. The powered hoist of the gantry crane transfers a shape to the dual conveyor belts for movement under the dual fabricating heads. Successive shapes, with accepted trade tolerance of one-inch in length, are length-centered under the fabricating heads by opposed, equally-powered rams simultaneously converged. On completion of fabrication the member moves forward for outbound loading in a gondola or trailer truck.

The process can perform any type of fabricating operation required in the production of floor beams and girders.

All of these operations are performed transverse to the length of the shape. The principal operations are varied piercing, cutting and coping of the shapes, and the assembling and securing of connection details to the main shape. The said objectives would be accomplished by mechanisms within the scope of this process for flame cutting and coping, drilling, connection angle placing, resistance welding, flame welding, and rivet heating and driving. To set forth the application of the complete process, typical varied apparatus are shown for resistance welding of end connection angles, for end flange and web drilling, and for drilling at any points on all faces of a girder member combined with assembly, rivet heating and riveting of dual end connection angles to the web of the member. The claims will be confined to the overall process although divisional applications may be filed for the various detailed apparatus.

The principles and the overall combined technique may also be applied to the production of columns and other members, using many of the varied fabricating units with slight variations and different combinations.

Figure 1:
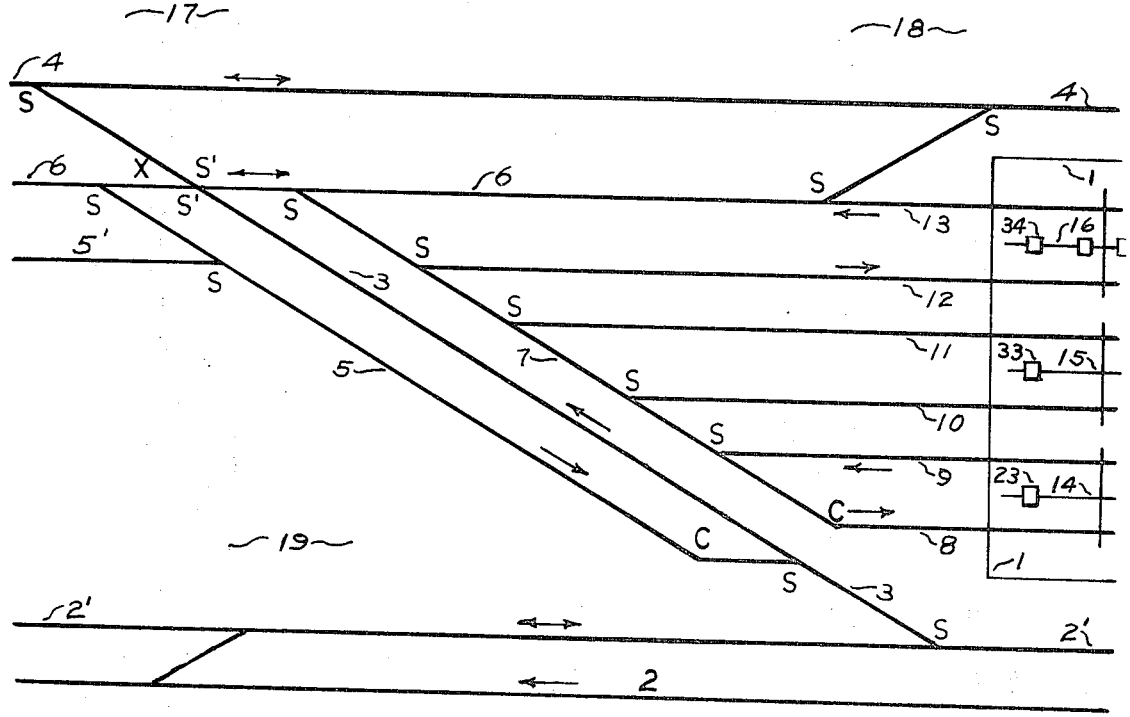
FIG. 1 is a plan-layout of the fabricating plant yard area.

FIG. 1, by standard railroad practice, shows a diagrammatic layout of a railroad car and auto truck-trailer handling yard adjoining a section of the fabricating shop 1. The cars delivering ordered lengths of shapes from the steel rolling mills come in off the main line 2 onto a local siding or freight spur 2' and then onto the yard lead track 3 for classification and priority by the plant's switching crew onto track 4. Outbound tracks 5 would generally hold cars of finished members that might extend onto 5'. Track 6 would serve as the drill track leading into the body track 7 for distribution of cars into and out of the rack tracks 8 to 13 serving the various fabricating layouts 14, 15, and 16. The heavy lines represent two-rail yard tracks. S indicates a switch, S' indicates slip switches combined with a crossing indicated by X, C indicates a curve and arrows indicate the usual direction of travel.

Auto truck trailer parking areas would be located at 17, 18 and 19, trucks being able to cross the tracks to the various fabricating layouts on flagman's signal.

Figure 2:
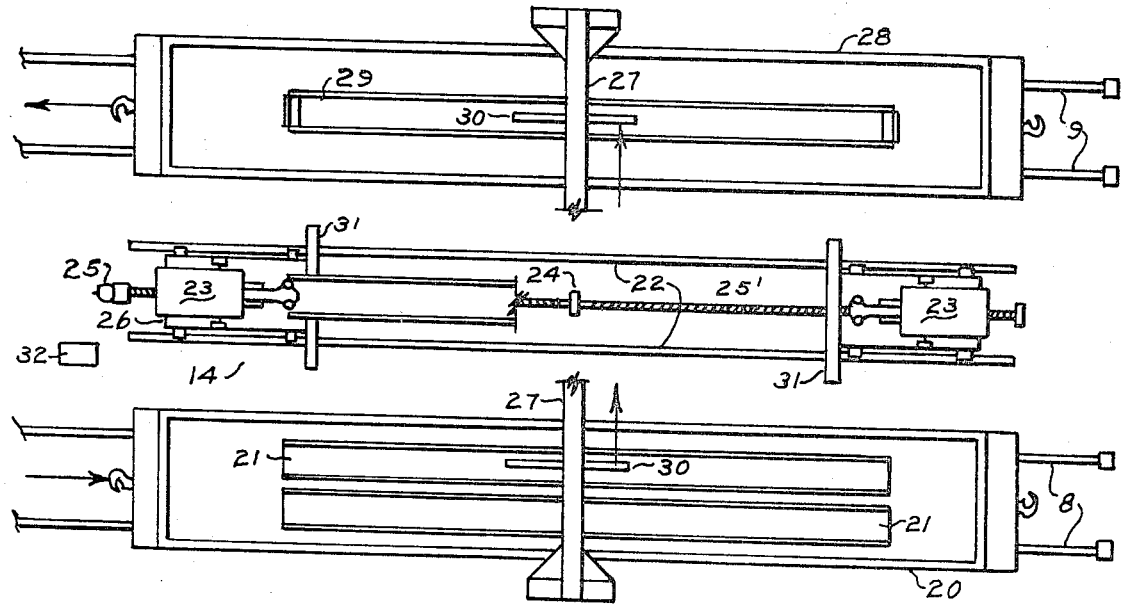
FIG. 2 is a plan-layout of dual cooperating end resistance welders.

FIG. 2 shows a plan-layout of an inbound railroad gondola 20 of raw shapes 21 located on the double rail rack track 8 of FIG. 1, located parallel to a two rail track 22 that supports and aligns end-located dual resistance welding units 23, which are symmetrically and variably spaceable from a central anchorage 24 by a powered 25 threaded drive shaft 25', oppositely threaded through the bases 26 of the opposite-hand paired fabricators 23. A transverse overhead trolley beam 27, spanning the tracks 8 and 22 and a parallel third track 9 on the far side for the outbound gondola 28 for finished members 29, provides a transverse supporting run for powered trolley, hoist and sling 30 to unload and load shapes from the car to dual belts 31 of welder fabricators 23 and back to the outbound car 28. Moved into the fabricating area by the dual conveyor belts 31 integral with the end fabricators 23 and located by stops, the shape is length centred over the central anchorage 24 by dual arms on the fabricators arced against opposite ends of the shape. Dual connection angles will then be assembled and welded to opposite sides of shape web at the ends thereof as described under FIGS. 5 and 6. Overall control console is 32.

Figure 3:
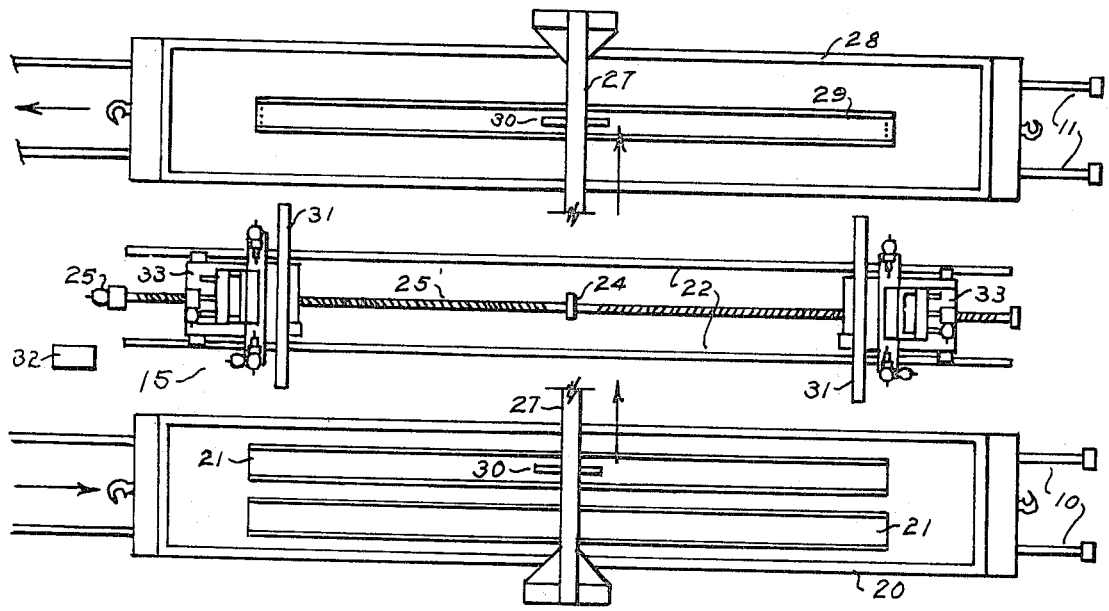
FIG. 3 is a plan-layout of dual cooperating end drilling units.

FIG. 3 shows the same type of plan layout for shape delivery, hoisting, conveying and loading into outbound delivery cars. The dual end drilling units 33 are supported, aligned and moved similarly as in FIG. 2. The said drilling fabricators drill the web and flanges of the shape equidistant from each end of the shape, after the length-centering of the shape by simultaneous equally projected opposed rams. See also FIGS. 7 and 8.

Figure 4:
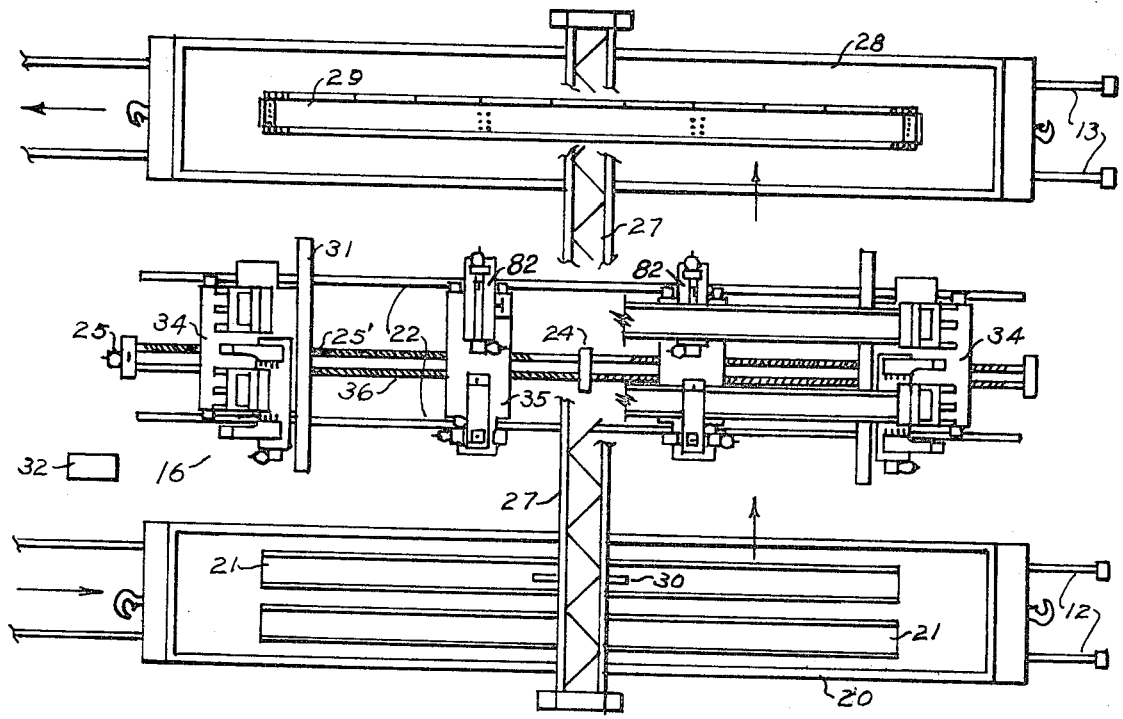
FIG. 4 is a plan-layout of dual end combined drilling and riveting units and intermediate combined drilling units.

FIG. 4 shows the generalized layout that is typical of FIGS. 1 to 3 and is basic to the entire process. Dual end fabricating units 34 combine mechanisms for the web and flange drilling of the shape, and the heating and placing of pre-assembled connection angles against the web of the shape and the riveting thereto. Dual intermediate combined drilling fabricators 35, wheel mounted on track 22, are symmetrically moved by oppositely threaded shaft 36. These fabricating units drill the web and one flange of the shape. Refer to FIGS. 9–11 and FIGS. 12 and 13.

FIGS. 5–6a show the welder 23 on a base 26 wheel mounted on the track 22. The welding mechanism is balanced on a shaft 37 elevatable above the base by a screw 38 operating runners 39 in dual posts 40. Distance registering dial 41, direct connected to locating shaft 25', records the distance the operating centre of the fabricator 23 is from the central anchorage 24. With welding jaws 42 open the conveyor belt 31 moves the shape into the operating position, where it is stopped by the solenoid 43 controlled stop pins 44 on the centre depth of the web. With the piston 45 operated rollers 46 elevated, the dual opposed length centering arms 47 are arced to locate the mid-length of shape over the anchorage 24. With the connection angle holders 48 extended by the pistons 49 in cylinders 50, the jaws 42 holding the dual connections 51 are closed on the web of the beam. The connection angle-contacting-electrodes 52 impress a welding current across the three intervening pieces of metal effecting a chain compound weld. With the jaws and the holders retracted, the shape is moved alternately forward and backward as the alternate closing of the jaws only executes the required successive number of spot welds, after the original spot weld fastens the angles to the web. Upon completion of the welding the shape moves forward for outbound loading.

FIG. 6a shows the posts 53 on the toe of base 26 supporting the steel chain link conveyor belt 31, powered by motor 54 and speed reducer 55 with the elevatable shape supporting roller on the forward end of the base.

FIGS. 7 and 8 show respectively an end and side view of the end drilling unit 33 wheel mounted on rails 22, comprising a forwardly projecting base 56, back wall 57, and bracket 58, supporting a forwardly extended vertical web-drilling mechanism 59. Shaft 25' moves the unit by means of the shaft threaded through the base. On the front of base, dual posts 53 support a frame 60 around which the chain link shape conveyor belt travels, powered by motor and speed reducer as in FIGS. 6a and 8a. On the front of the conveyor frame of FIG. 8a, a hand wheel 61 and screw 62 adjust the solenoid mounting 43 with stop pin 44 to locate the various depths of shapes in proper relation to the multiple drill 63 spindles 64 by interrupting the current to the conveyor belt motor. On the upper bracket, plural air cylinders 65, pistons 66, and piston rods 67 vertically project drilling spindles, chucks and drills against the shape web on the conveyor belt. Non-rotatable piston rods are connected to a vertical guide 68, T-keyed to the wall of the bracket with the rotatable drill spindles connected to the lower end of the guide. Splined drill spindles extend through the gear box 59 and are rotated by gears meshing with plural gears on the common gearbox drive shaft 71, that is powered by the motor 72 and speed reducer 73. Any number of drills can be used in any selected pattern simultaneously or consecutively. Standard structural spacing is 3 inches for this class of work. Direct numerical reading dial box 41 on the base direct-connected to the relocating shaft, continuously indicates the distance the drills are located from the mid-length anchorage and transverse measuring axis 24. Thus, twice the measurements shown on the dials gives the effective working length of the finished member 29. With the shape transversely conveyed to the fabricating position under the drills, the matched and synchronized motors 75 on the rear of the back walls 57 of the opposed end units 33, through the speed reducer gearboxes 76, equally project the length centering rams 77 against the opposite ends of the shape. The resistance, when the shape is length centered stops the motors. Longitudinally adjustable dual pointers 78 in the top of the square shaft of ram indicate visually to scale if the overall length of the shape falls within the permissible tolerance for maximum and minimum lengths of the member.

A wide transverse platen 79 T-keyed 80 to the front of the backwall is elevatable vertically above the base by a motorized threaded shaft 81. Opposed two-spindle adjustable-centering-horizontal drill mechanisms 82, T-keyed 83 into the horizontal upper surface of the platen, are transversely convergable by motorized right and left threaded shaft 84 to drill the intermediately located shape flanges 85. An adjustable stop (not shown) limits the upward platen travel. FIG. 8a, showing an elevation of the conveyor belt for FIG. 7, is similar to FIG. 6a without the elevating roller. It shows the detail of the stop pin mechanism as heretofore described.

FIG. 8b shows a shape-clamping two jaw vise 85 with inner tongues 86 for the support of the shape web 87 by various diameter discs 88 loosely placed on dual rollers 89 journalled in slots in the tops of the inner tongues. Larger or smaller discs placed in the slots adjust the horizontal centre line of the web up or down to locate extra thin or thick webs half way between the upper and lower horizontal flange drills. It also enables the longitudinal rams to smoothly and easily length-centre the shape over the mid-length anchorage. The vise, not shown in FIG. 7 for better presentation of the major components of the said figure, is transversely T-keyed 90 to the narrowed 91 platen near its front edge with adjusting screws 92 for each jaw.

FIG. 9 showing a left-hand side elevation, partly in section, of FIG. 10 is basically in design and operation similar to FIG. 8. For the two-spindle adjustable dual drill heads of FIG. 8, it substitutes dual gang drill units 93 with multiple pairs of adjustable spindles and drills 94 in paired drill boxes 95. The said drill spindles are geared to and driven by common dual drive shafts 96 connected by universal joints 97 and splined shafts 98 and gears to a master drive shaft 99 in a speed reducer 100 driven by a motor 101. The said mechanism is valuable in effecting wind-bracing knee-connections to columns. Vertcial drilling of shape web is as shown in FIG. 8.

FIGS. 10 and 11 show a combined drilling and riveting apparatus 34 with an integral rivet heating and placing mechanism 102 for the use of connection angles with integral rivet protruding shanks 103 on a raised base 104. The right hand half of FIG. 10 with FIG. 11 shows a base 105 and back wall 106 common to the drilling, riveting and heating-placing elements. Two lower connection angles 107, with multiple integral rivet shanks, are placed in slots 108 in a non-conductive holder block 109, with a recessed bus bar 110 connected to one leg of an electrical circuit. Racked bars 111, projected down against the tops of the rivets by pinion gears 112, shaft 113 and hand wheel 114, carry a non-conductive channel 114'. In the side of the channel trough a side bus bar, upper compressible rubber and woven wire conductor 115 held by bottom retaining plates complete the circuit for the resistance heating of the rivet to a heading-driving temperature. With the lower connection angle holders 116 moved down, the upper electrode bar 114' is raised and an insulated angle push stick 117 moves the connection angles 107 into place under the holes in the shape web and the predrilled upper mating connection angles 118. Piston and rod in cylinder 119 moves the riveting bracket 120 down and solenoid, air power or a piston in air cylinder 121 projects a racked locking bar 122 into the bracket to fix the required brackets. With the upper angle in the slotted end of the bracket, the lower carriers 116 are raised by the threaded shafts 123 to force and lock the three intervening steel pieces together. Pistons in cylinders 124 lower the reciprocating riveting hammers 125 and snaps 126 against the ends of the rivets to head the rivets. With mechanisms retracted, the finished member 29 is lowered to the conveyor for discharge and loading.

Roller wheels 127 operating in slots in the bottom of holder block 109 permit longitudinal shifting of the angles 107 under the electrodes 115 and into loading position. A non-conductive top board 128 supports the shaft bearing brackets 129. T slots 130 on face of wall 106 guide the lower holders 116 and the riveting brackets 120. A motor 130, with a lever 131 to vary the torqueing power of an adjustable clutch in case 132, drives speed reduction gearing in a common gear box 133 that rotates the raising screws into or out of action.

Strong detents bearing against the angle 118 in the lower end of the bracket 120 hold the angle in the slot. The conveyor 31 assembly detailed in FIGS. 8–9 is shown here in outline.

FIGS. 10a and 11a show an alternate rotary rivet heating and assembling mechanism 102'. It comprises an eight slot non-conductive angle holding block 109', with a loading position and two heating positions. The octagonal block 109' is held by two steel end flanges 148 carried on a transverse shaft 149 journalled in the frame 104' on the base 105. An air motor 150 on the end of a T-slotted channel 151, by means of a threaded shaft 152, transversely projects an insulated follower 153 against the end rivet of the angle to locate it under the holes in the web of shape 21. A loading shelf 154 provides convenient safe loading of the angles. A strongly sprung electric terminal contacts the bus bar 110 with flexible cables completing the circuit through the bus bar and woven conductor 115 and 114'.

FIGS. 12 and 13 of intermediate combined drills show an adjustable-centre two-spindle flange drill 82 on the left hand side that is a one half version of FIG. 7. Most flange holes, located intermediately of the ends of a shape, are only located in one flange for the attachment of loose spandrel angles supporting exterior masonry walls.

On the right hand side of the base 139, an upper drill frame 135 vertically pivoting on a powered 136 horizontal shaft 137 supported in a standard 138 on base 139, is raised to drill the shape web. Motor 140 projects the powered 141 drill box 142 down to carry the rotating drills through the web. On retraction of the drills, the frame 135 is depressed to permit the placement of the following shape on the dual conveyor belts. A compressed air cylinder 143 cushions the retracting stop 143'. An adjustable stop 144 locates the top position of frame 135. Current carrying arm 145, fixed to shaft 137 contacting the terminals 146 and 147, actuates the motor 136 on and off.

FIGS. 14 and 15 show a side and end view of the lower half of the prefabricated connection detail, with rigidly attached multiple rivet shanks projecting beyond the contact face of the connection angle. There are numerous ways of rigidly attaching these rivets to the connection angle by resistance or fusion welding, force fitting into precisely drilled holes or shrink fitting into heated angles, generally using a lower-button-headed rivet, and machine resistance welding into tapered holes all of which are set forth as minor equivalents. The said shanks are precisely located on centres to fit to the predrilled holes in the contact leg of the mating upper angle. The other leg of the mating angle is predrilled, usually to the American Institute of Steel Construction specifications.

What I claim as new and desire to protect by Letters Patent of the United States is:

1. A structural member fabricating process comprising in combination the following steps:

the routing of a vehicle of raw shapes to the side of a longitudinally disposed fabricating apparatus, the unloading of said shapes onto transverse dual conveyor belts integral with dual end fabricating units by a hoist operating along a transverse overhead beam, the length-centering of said shapes between opposed said end units by longitudinal equally-convergible rams integral with said fabricating units, the executing of plural simultaneous fabricating operations on the said shapes by the prelocation of said fabricating units variably spaceable on a common longitudinal track, the loading into a shipping vehicle for outbound routing, whereby the said plural shapes are transported continuously through the coordinated shipping and mechanized hoisting, conveying, laying-out, and fabricating process in a single continuing handling to completion as outbound finished members.

References Cited
UNITED STATES PATENTS

| | | | |
|---|---|---|---|
| 2,405,544 | 8/1946 | Anjesty | 29—430 |
| 3,052,140 | 9/1962 | Guyer | 29—200 |
| 3,113,373 | 12/1963 | Guyer | 29—155 |
| 3,119,173 | 1/1964 | Gluser | 29—200 |
| 3,362,056 | 1/1968 | Preller et al. | 29—155 |

THOMAS H. EAGER, Primary Examiner

U.S. Cl. X.R.

29—155, 200